US008996151B2

(12) United States Patent
Bouffiou et al.

(10) Patent No.: US 8,996,151 B2
(45) Date of Patent: Mar. 31, 2015

(54) VISUALIZATION OF PRODUCT BUILD USING PRECEDENCE TRANSVERSAL METHOD

(75) Inventors: Carl E. Bouffiou, Tacoma, WA (US); Robert J. Schreiber, Kirkwood, MO (US); Steven E. Franzen, St. Charles, MO (US); Joe Anelle, Weldon Spring, MO (US); William A. Kehner, Lake Tapps, WA (US); Mark E. VanHorne, Bellevue, WA (US); Robert Lorbeski, Renton, WA (US)

(73) Assignee: The Boeing Company, Chicago, IL (US)

( * ) Notice: Subject to any disclaimer, the term of this patent is extended or adjusted under 35 U.S.C. 154(b) by 770 days.

(21) Appl. No.: 12/893,031

(22) Filed: Sep. 29, 2010

(65) Prior Publication Data

US 2011/0022208 A1 Jan. 27, 2011

Related U.S. Application Data

(63) Continuation-in-part of application No. 11/270,399, filed on Nov. 9, 2005, now abandoned.

(51) Int. Cl.
*G06F 19/00* (2011.01)
*G05B 19/418* (2006.01)

(52) U.S. Cl.
CPC *G05B 19/41805* (2013.01); *G05B 2219/31029* (2013.01); *G05B 2219/31044* (2013.01); *G05B 2219/31053* (2013.01); *G05B 2219/32084* (2013.01)
USPC ............... 700/98; 700/107; 700/97; 700/95; 705/29; 715/853

(58) Field of Classification Search
CPC ....................................................... G06F 19/00
USPC ............ 700/107, 98, 97, 95; 705/29; 715/853
See application file for complete search history.

(56) References Cited

U.S. PATENT DOCUMENTS

| 5,247,651 A | 9/1993 | Clarisse |
| 5,479,343 A | 12/1995 | Matoba et al. |

(Continued)

FOREIGN PATENT DOCUMENTS

| EP | 0 483 039 A2 | 4/1992 |
| EP | 06 02 3204 | 2/2010 |
| WO | WO03007098 | 1/2003 |

OTHER PUBLICATIONS

Boeing Phantom Works, Process Analyzer 4.5 User Manual; The Boeing Company Jun. 15, 2004.
Engineering Process Council, Integrated Product & Process Structure White Paper; The Boeing Coompany Jul. 11, 2001.

(Continued)

*Primary Examiner* — Tejal Gami
(74) *Attorney, Agent, or Firm* — Parsons Behle Latimer

(57) ABSTRACT

A method for visualization of product build which includes compilation of a virtual temporal configuration of an in-process assembly and visualization of the results using three-dimensional representations of the affected products and associated resources. An illustrative embodiment of the method includes formulating a plurality of installation plans each adapted to direct production of a portion of a product within a build sequence of the product and enabling three-dimensional virtual visualization of a temporal build state of the portion of a product for each of the installation plans.

8 Claims, 8 Drawing Sheets

(56) References Cited

U.S. PATENT DOCUMENTS

| | | | |
|---|---|---|---|
| 5,596,502 A * | 1/1997 | Koski et al. | 700/95 |
| 5,764,953 A | 6/1998 | Collins et al. | |
| 5,850,345 A | 12/1998 | Son | |
| 5,867,713 A | 2/1999 | Shrader et al. | |
| 5,953,707 A | 9/1999 | Huang et al. | |
| 6,233,493 B1 | 5/2001 | Cherneff et al. | |
| 6,782,295 B2 | 8/2004 | Martz, Jr. et al. | |
| 6,820,042 B1 | 11/2004 | Cohen et al. | |
| 6,826,518 B1 | 11/2004 | Ivezic et al. | |
| 6,983,232 B2 | 1/2006 | Nguyen et al. | |
| 7,321,804 B2 | 1/2008 | Zayic et al. | |
| 2002/0038163 A1 | 3/2002 | Hazama | |
| 2002/0080194 A1 * | 6/2002 | Fujieda | 345/853 |
| 2002/0165744 A1 | 11/2002 | Juras et al. | |
| 2004/0210467 A1 | 10/2004 | Yokoyama | |
| 2004/0255236 A1 | 12/2004 | Collart | |
| 2006/0010017 A1 | 1/2006 | Hase et al. | |

OTHER PUBLICATIONS

Process Driven Manufacturing Bill of Material; The Boeing Company Jul. 11, 2011.

7E7 Process and System Integration Decision, Installation Plan Fulfills Types; The Boeing Company Jan. 1, 2005.

PES (Product Enhancement Specifications)—Manufacturing Context Visualization Capabilities; Dassault Systems Jan. 1, 2003.

PES Filter the Computed Manufacturing Context based on Certain Attributes for Product & Resource; Dassault Systemes Jan. 1, 2003.

PES Enhancement Computation of Manufacturing Context in Max Mode; Dassault Systemes Jan. 1, 2005.

PES Display the Manufacturing Context Data in the State Associated to the Process; Dassault Systemes Jan. 1, 2005.

PES Standard Volumetric Filter Computed Manufacturing Context; Dassault Systemes Jan. 1, 2005.

Ou-Yang, C. and Jiang, T.A., Developing an Integration Framework to Support the Information Flow Between PDM and MRP.; Int. J. Adv. Manuf. Technol. Jan. 1, 2002.

* cited by examiner

VISUALIZATION OF PRODUCT BUILD USING PRECEDENCE TRANSVERSAL METHOD

CROSS-REFERENCE TO RELATED APPLICATIONS

This application is a continuation-in-part of U.S. application Ser. No. 11/270,399, filed Nov. 9, 2005, now abandoned and entitled "SYSTEMS AND METHODS FOR PRODUCTION PLANNING BY VISUALIZING PRODUCTS AND RESOURCES IN A MANUFACTURING PROCESS".

TECHNICAL FIELD

The disclosure generally relates to information technology pertaining to planning and assembly of complex structures such as aircraft. More particularly, the disclosure relates to visualization of product build using a precedence transversal method which includes compilation of a virtual temporal configuration of an in-process assembly and visualization of the results using three-dimensional representations of the affected products and associated resources.

BACKGROUND OF THE INVENTION

Complex manufacturing projects such as the design and manufacture of aircraft generally require that engineering information, component parts and processes be successfully integrated. With regard in particular to the production of aircraft, typically hundreds of thousands of parts and associated processes must be successfully integrated according to a comprehensive plan to produce an aircraft in accordance with the engineering information.

Engineering information typically includes engineering drawings and parts lists that cooperatively form an engineering product plan that describes how materials, components assemblies and sub-assemblies must be combined to form the desired product. A manufacturing process plan is subsequently compiled so that the identified parts in the desired product may be properly sequenced for assembly on the factory floor. Suitable sequencing and coordination is particularly important in complex projects since factors such as the overall cost of the project, the time required for completion of the project, and the risk of failure must be accurately estimated. In addition, other variables of importance such as the overall efficiency of the project need to be accurately estimated. Accordingly, the manufacturing process plan typically includes factory floor planning, tool planning and assembly sequencing, a compilation of work plans for assembly personnel, assembly plans, and other similar activities.

Although existing process planning and analysis methods are useful, they nevertheless exhibit several drawbacks, and thus may not accurately represent a selected process. For example, the planned configuration, as expressed in the manufacturing process plan may require assembly of the product in a sequence not contemplated by the designed configuration, as expressed in the engineering process plan. Since existing methods generally do not permit variability in tasks or resources in the process to be effectively resolved, conflicts that arise during the product assembly must often be resolved informally on the factory floor, which in turn, often requires expensive and time-consuming rework.

Previous process planning systems may not be capable of analyzing the assembly sequence of complex assemblies in a sufficiently discreet manner to identify problems prior to production implementation. When multiple sub-products or product systems (e.g. hydraulics, fuel, electrical, structures, etc.) are planned by separate technical groups, there may be no efficient method of determining if dependent parts are installed in a sequence which supports specific assembly sequence requirements (i.e., sequencing anomalies). This inability to analyze and correct assembly problems prior to production implementation may cause assembly sequence conflicts to not be identified until physical assembly on the factory floor. This may cause change, error and rework which may affect cost and schedule.

Current process planning methods may be labor intensive and prone to error. One method may require human interpretation of two-dimensional (2D) blueprints and textual information about the process plans in order to assess which parts or resources exist on the temporal configuration of the product assembly. This method may not allow the product to be visualized in a three-dimensional space and may be dependent on human interpretation of processes to identify the temporal assembly configuration. Therefore, the user may be required to imagine the temporal assembly configuration.

Another process planning method may include construction of physical mock-ups in which a pre-production example of the product is built. This method may not represent the temporal assembly state of a product but may only validate that the product design is complete.

Still another process planning method may use CAD model-based assembly trees in which the full assembly or a subassembly of parts is loaded into a viewing screen and the parts are manually added or removed to emulate the assembly state. However, this method may be difficult to maintain for multiple product configurations and may not accurately represent the process input from multiple disciplines.

What is needed is a visualization of product build using a precedence transversal method which includes compilation of a virtual temporal configuration of an in-process assembly and visualization of the results using three-dimensional representations of the affected products and associated resources. The method may allow a user to understand the product assembly configuration at any point in the build sequence.

SUMMARY

The disclosure is generally directed to a method for visualization of product build which includes compilation of a virtual temporal configuration of an in-process assembly and visualization of the results using three-dimensional representations of the affected products and associated resources. An illustrative embodiment of the method includes formulating a plurality of installation plans each adapted to direct production of a portion of a structure within a build sequence of the structure and enabling three-dimensional virtual visualization of a temporal build state of the portion of a structure for each of the installation plans.

In some embodiments, the method for visualization of product build may include formulating a plurality of installation plans each having processes, components and resources adapted to direct production of a portion of a structure within a build sequence of the structure; formulating a control station precedence network by arranging the installation plans according to precedence within the build sequence of the structure; and enabling three-dimensional virtual visualization of a temporal build state of the portion of a structure for each of the installation plans.

In some embodiments, the method for visualization of product build may include formulating a plurality of installation plans each having processes, components and resources adapted to direct production of a portion of a structure within a build sequence of the structure; formulating a control station precedence network by arranging the installation plans according to precedence within the build sequence of the structure; enabling three-dimensional virtual visualization of a temporal build state of the portion of a structure for each of the installation plans; determining a minimum manufacturing context of the components and resources in the installation plans; and determining a maximum manufacturing context of the components and resources in the installation plans.

BRIEF DESCRIPTION OF THE DRAWINGS

Embodiments of the present invention are described in detail below with reference to the following drawings.

DETAILED DESCRIPTION

The present invention relates to systems and methods for production planning in a manufacturing process. Many specific details of certain embodiments of the invention are set forth in the following description and in FIGS. 1 through 5 to provide a thorough understanding of such embodiments. One skilled in the art, however, will understand that the present invention may have additional embodiments, or that the present invention may be practiced without several of the details described in the following description.

Figure 1:
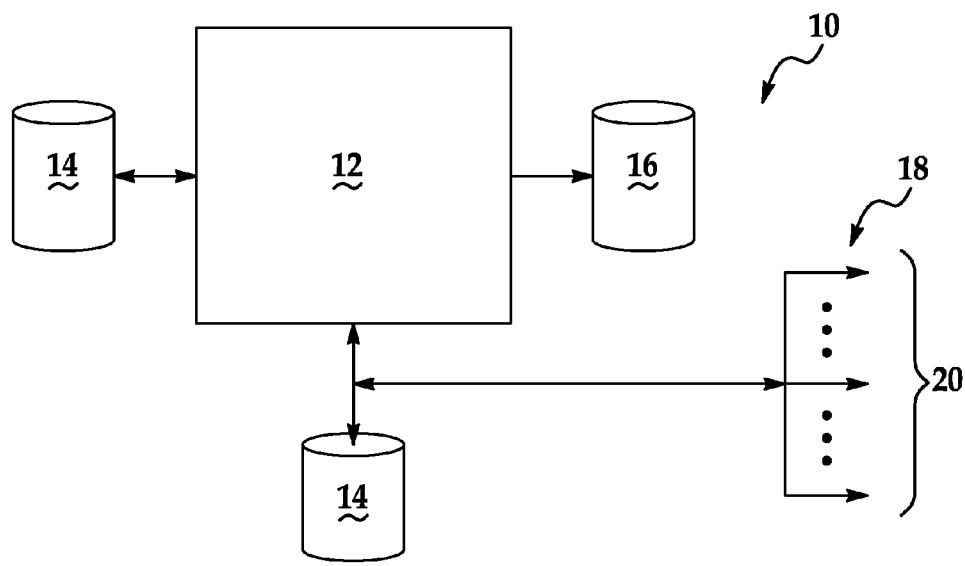
FIG. 1 is a block diagrammatic view of a system for production planning in a manufacturing process, according to an embodiment of the invention.

FIG. 1 is a block diagrammatic view of an apparatus 10 for production planning in a manufacturing process, according to an embodiment of the invention. The apparatus 10 includes a processing unit 12 that generally includes any programmable electronic device that is operable to receive programming instructions and input data, and to process the data according to the programming instructions. Although a single processing unit is shown in FIG. 1, the processing unit 12 may be comprised of a plurality of processing units that are coupled serially or in parallel so that each processing unit performs a selected portion of a total computational task performed by the processing unit 12. The apparatus 10 also includes a product information database 14 that is operable to store engineering information of various types. For example, the engineering information database 14 may include digital representations of selected component parts that collectively comprise the product generated in the manufacturing process and resource (tool) designs. Accordingly, the digital representations may include two-dimensional and/or three-dimensional digital models that are compatible with known computer-aided design (CAD) systems. Other engineering information may be included in the database 14. For example, the database 14 may include drawing trees that permit engineering drawings to be accessed in an ordered manner, as well as parts lists that define the configuration of the product. Other information stored in the database 14 may include part tolerances and process specifications such as torque requirements, and any other desired information. In a particular embodiment of the invention, the engineering information database 14 may be compiled as disclosed in a co-pending and commonly owned U.S. patent application Ser. No. 11/013,311 filed on Dec. 15, 2004, entitled "Systems and Methods for Process-Driven Bill of Material", which application is incorporated by reference herein.

The apparatus 10 also includes a process information database 16 that is operable to store process-related information for the product generated in the manufacturing process. Briefly and in general terms, the process information database 16 may include part, resource and planning relationships for a selected component part or assembly. In particular, the planning relationships may include precedence networks that describe a predetermined assembly sequence for an assembly or sub-assembly. In the present discussion, a precedence network is a multi-dependency representation of a product build plan that includes the various activities in the product build plan depicted as nodes, and further includes sequence elements that express at least a temporal relationship between the various nodes. Although FIG. 1 shows the databases 14 and 16 as discrete operational units, it is understood that the informational content of the databases 14 and 16 may be incorporated into a single unit.

With continued reference to FIG. 1, the apparatus 10 includes a communications system 18 that is configured to communicate with the processor 12. Accordingly, the communications system 18 may be used to provide engineering and/or planning data to the processor 12, which may suitably format the engineering and/or planning data for storage in the database 14 and the database 16. The communication system 18 may include a wide area network (WAN) or a local area network (LAN), but in a particular embodiment, the communications system 18 includes an internet-based system. In any case, the communications system 18 is coupled to one or more requestors 20 that communicate with the processor 12 through the communications system 18. The one or more requestors 20 thus provide engineering and/or planning data to the processor 12, and receive suitably processed data from the processor 12 through the communications system 18.

The apparatus 10 includes a storage device 22 that receives processed information from the processing unit 12, which will be described in greater detail below. Alternately, the storage device 22 may also serve as an intermediate storage location for information generated by the processor 12 before the information is transferred to one or more information requestors 20.

The operation of the apparatus 10 of FIG. 1 will now be described in detail. As discussed above, the requestors 20 may transfer engineering and/or planning data to the apparatus 10 through the communications system 18 so that the data is available to the processor 12. The engineering data generally describes the configuration of a desired product, such as a commercial aircraft, while the planning data generally comprises an assembly definition, which is generally expressed as a precedence network. Briefly, and in general terms, the planning data describes the sequence definition that may be used to define the schedule. The processing unit 12 accordingly processes the data to generate "context" information that reflects a selected assembly or sub-assembly at a desired stage of assembly.

For example, in one particular embodiment, and with reference to aircraft production, hydraulics, fuel, electrical systems, and structural design may generally be executed and planned by different organizations that may develop respective designs and planning information with minimal mutual interaction. Accordingly, one or more conflicts may result during integration of the foregoing systems and/or structures designs. For example, at a selected integration step, it may be determined that the assembly must be partially disassembled in order to permit the installation of other systems and/or structural components because the prior integration steps were not properly sequenced. Further, at the selected integration step, it may become apparent that sufficient access is not present to admit a tool and/or a hand to affect the integration step, due to an error in the design of a system and/or a structural component. Accordingly, the context information generated within the processor 12 includes two and/or three-dimensional digital models that may be retrieved from the product information database 14 that are selectively combined with information in the process information database 16 to provide a graphical view of an assembly at a selected integration step. Thus, if conflicts are observed in the context information, the product information (stored in database 14) and/or the process information (stored in database 16) the information may be readily altered to specify a different design and/or assembly sequence to avoid the observed conflicts. Accordingly, conflicts between the product, process and resource definitions may be advantageously resolved prior to the release of the foregoing definitions.

Figure 2:
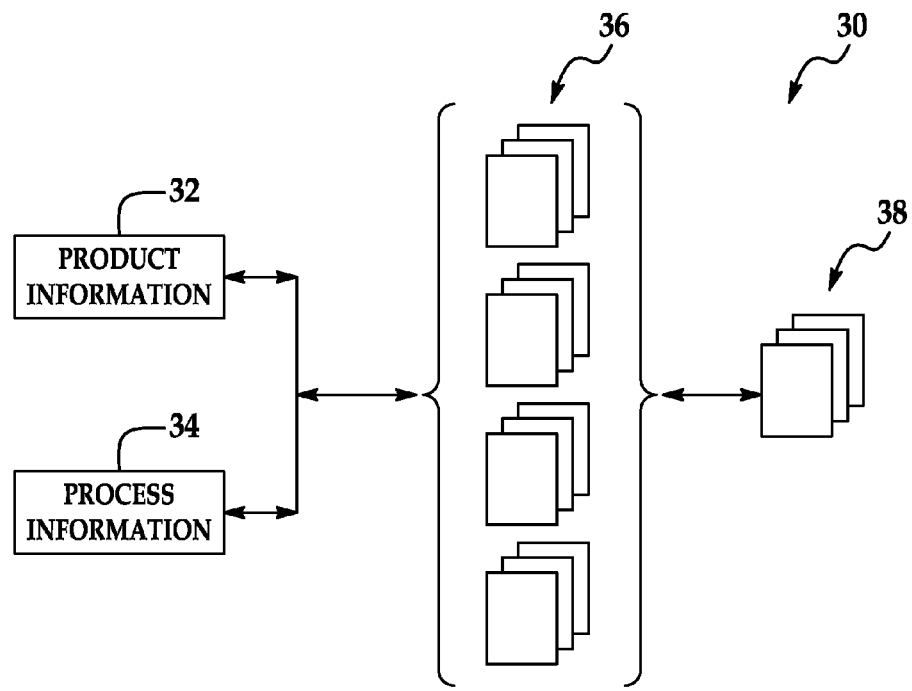
FIG. 2 is a partial schematic view of a system of managing product and process information in a manufacturing process, according to another embodiment of the invention.

FIG. 2 is a partial schematic view of a method 30 of creating and managing a manufacturing plan in a manufacturing process, according to another embodiment of the invention. The method 30 includes compiling a product and designed resource (tool) information source 32 and a process information source 34 that are generally separately compiled and provide design configuration information for components, assemblies and/or sub-assemblies, and assembly sequencing and planning information, respectively. The product and resource information source 32 and the process information source 34 thus include information for a variety of interrelated systems that are generally prepared by various engineering and planning groups.

As further shown in FIG. 2, selected portions of the product and resource information source 32 and the process information source 34 may be extracted and processed (as described in detail with reference to FIG. 1) to generate a plurality of contexts 36. The contexts 36 are graphical representations of selected assemblies and/or sub-assemblies that may be reviewed by affected engineering and/or planning groups so that conflicts resulting from planning and/or engineering errors may be detected. For example, the design of components that comprise the selected assembly may introduce conflicts that preclude assembly efficiency by requiring partial disassembly of a previously assembled object so that access for a hand, a tool, or other required access, may be obtained. Similarly, planning information conflicts may introduce the foregoing access difficulties, and may also introduce difficulties of different kinds For example, the planning information may require the use of selected installation tools, which are not subsequently removed. Consequently, the installation tools may undesirably be incorporated into the assembly.

On the basis of the foregoing review of the contexts 36, revised information may be introduced into at least one of the product/resource information sources 32 and the process information source 34, so that a revised plurality of the contexts 36 may be generated and evaluated. The evaluation of the contexts 36 may proceed by visually examining each of the contexts 36 under various selected viewing conditions. For example, and in one selected embodiment, selected portions of the assembly may be highlighted using a desired color while other portions of the assembly are uniformly presented in a contrasting color, so that the selected portion may be clearly viewed. In another specific embodiment, the selected portions of the assembly may be desirably highlighted, while other portions are viewed as "grayed" with lower contrast than the highlighted portions.

Still other specific embodiments of processes for visual examination are possible. For example, the selected portion of the assembly may be viewed using a minimum viewing option that shows all of the assembled structure and processes that must have occurred in a preceding path (as expressed, for example, in a precedence network corresponding to the assembly). Conversely, a maximum viewing option would be operable to provide a comprehensive view that includes not only a preceding path, but contributions from parallel paths in the precedence network that may have occurred also. Contexts may also be selectively viewed by applying a filter to the context that is based upon certain selected attributes of the assembly so that selected portions of the context may be viewed. Filtering the context advantageously permits a viewer to remove extraneous detail and view only the data that is relevant to the viewer.

Still referring to FIG. 2, based upon successive generation and review of the contexts 36, a final context 38 is generated that reflects a relatively matured informational content in the product information source 32 and/or the process information source 34. The final context 38 may advantageously be used as a baseline context for future design and planning efforts, and may also be used as a training aid for instructing personnel in the proper assembly of a selected assembly. Still other uses for the final context 38 are possible. For example, it may be advantageously used to develop repair and/or maintenance operations. It is understood, however, that the final context may be continuously evolving, so that no entirely definitive context may exist.

Figure 3:
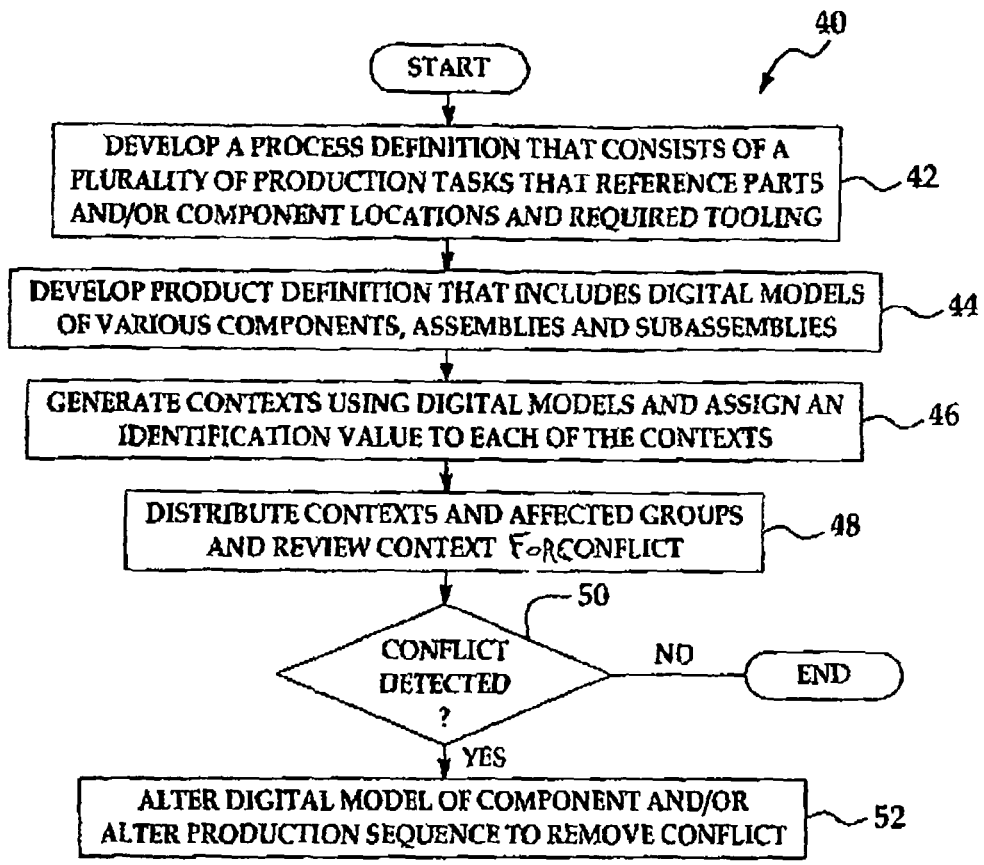
FIG. 3 is a flowchart that describes a method of managing product and process information in a manufacturing process, according to still another embodiment of the invention.

FIG. 3 is a flowchart that will be used to describe a method 40 of managing product and process information in a manufacturing process, according to still another embodiment of the invention. At block 42, a process definition is developed that includes a plurality of production tasks that reference part and/or component locations, required tooling and a temporal representation of the production tasks, as expressed for example, in a precedence network. At block 44, a product definition is formulated that includes digital representations of various components, assemblies and sub-assemblies. In a specific embodiment of the present invention, the digital models are created and viewable using the CATIA digital modeling system. At block 46, contexts are generated using the product definition and the process definition and an identification value may be assigned to each of the contexts. The identification value may be used to identify an affected group (e.g., the identification value may be an address that corresponds to the affected group), or it may refer to a particular version of the context. At block 48, the contexts are communicated to the one or more affected groups for review. The affected groups may include planning personnel and/or design personnel that may engage in a colloquy regarding planning and/or the design of the desired product. At block 50, if a conflict is detected that is related to planning or design, or both, then the digital model of a selected component and/or a assembly sequence may be selectively altered to remove the conflict, as shown in block 52. If no conflicts are detected, the method terminates, as also shown at block 50. Otherwise, the method 40 recursively returns to block 46, and revised contexts are generated.

Figure 4:
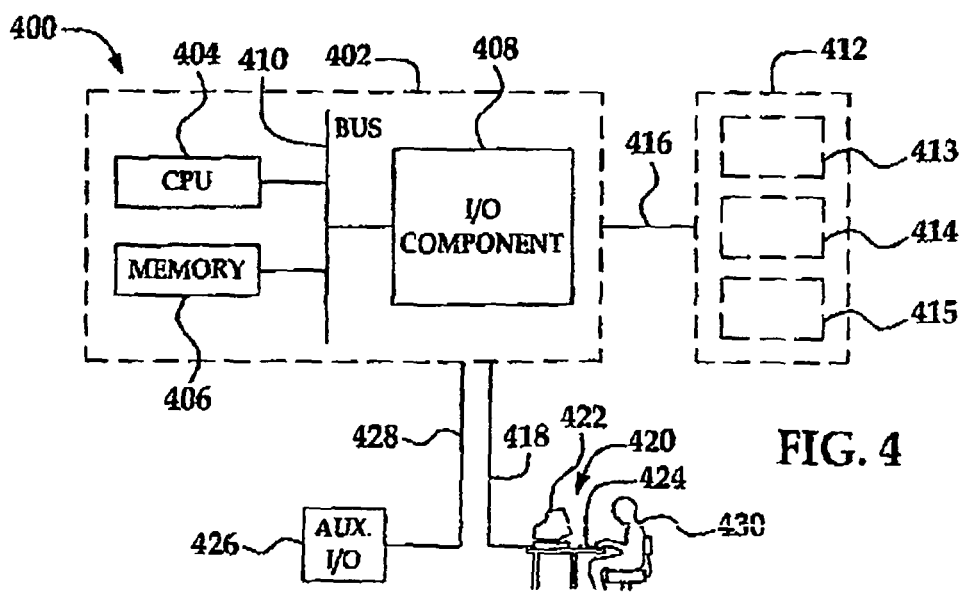
FIG. 4 is a system for performing a manufacturing process in accordance with an embodiment of the present invention.

Embodiments of methods and systems in accordance with the present invention may be implemented on a variety of computing hardware platforms. For example, FIG. 4 is a system 400 for performing a manufacturing process in accordance with an embodiment of the present invention. Unless otherwise specified below, the components of the system 400 are of generally-known construction, and will not be described in detail. For the sake of brevity, only significant details and aspects of the system 400 will be described. As shown in FIG. 4, in this embodiment, the system 400 includes a computer 402 having a central processing unit (CPU) 404 and a memory component 406. The memory component 406 may include one or more memory modules, such as Random Access Memory (RAM) modules, Read Only Memory (ROM) modules, Dynamic Random Access Memory (DRAM) modules, and any other suitable memory modules. The computer 402 also includes an input/output (I/O) component 408 that may include a variety of known I/O devices, including network connections, video and graphics cards, disk drives or other computer-readable media drives, displays, or any other suitable I/O modules. A data bus 410 operatively couples the CPU 404, memory component 406, and the I/O component 408.

The system 400 embodiment shown in FIG. 4 further includes a data base 412 operatively coupled to the computer 402. The database 412 is operatively coupled to the computer 402 via a first communication link 416. In this embodiment, the database 412 includes a first portion 413 adapted to store product information, a second portion 414 adapted to store process information, and a third portion 415 adapted to store processed information from the computer 402.

As further shown in FIG. 4, the system 400 further includes a control component 420 having a monitor 422 and a command input device 424 (e.g. a keyboard, an audio-visual input device, etc.). A second communication link 418 operatively couples the control component 420 to the computer 402. The system 400 also includes an auxiliary output device 426 coupled to the computer 402 by a third communication link 428. The auxiliary output device 426 may include a printer, a compact disk (CD) burner, a storage device, a communication port, or any other desired output device.

In one aspect, a machine-readable medium may be used to store a set of machine-readable instructions (e.g. a computer program) into the computer 402, wherein the machine-readable instructions embody a method of performing manufacturing operations in accordance with the teachings of the present invention. The machine-readable medium may be any type of medium which can store data that is readable by the computer 402, including, for example, a floppy disk, CD ROM, optical storage disk, magnetic tape, flash memory card, digital video disk, RAM, ROM, or any other suitable storage medium. The machine-readable medium, or the instructions stored thereon, may be temporarily or permanently installed in any desired component of the system 400, including, for example, the I/O component 408, the memory component 406, and the auxiliary output device 426. Alternately, the machine-readable instructions may be implemented directly into one or more components of the computer 402, without the assistance of the machine-readable medium.

In operation, the computer 402 may be configured to perform one or more of the aspects of the methods of manufacturing described above. For example, an operator 430 may input a command through the command input device 424 to cause the computer to retrieve product information from the first portion 413 of the data base 412 and process information from the second portion 414 of the data base 412. The computer 402 may then use a set of software instructions stored in the computer 402 (e.g. in the memory component 406) that performs one or more aspects of the methods of manufacturing described above on the product and process information, and may then transmit processed information to the third portion 415 of the data base 412. Alternately, one or more aspects of the various processes described above may be implemented in the computer 402 using any suitable programmable or semi-programmable hardware components (e.g. EPROM components).

Results of the processes performed by the computer 402 in accordance with one or more embodiments of the invention may be transmitted via the data bus 410 to the I/O component 408. The results may also be transmitted to the control component 420 and to the auxiliary output device 426 via the second and third communications links 418 and 428. The operator 430 may view the results of the one or more methods on the control monitor 422, and may take appropriate action, including revising analysis parameters and inputs, and continuing or repeating the one or more embodiments of analysis methods using different product and process information as desired.

Figure 5:
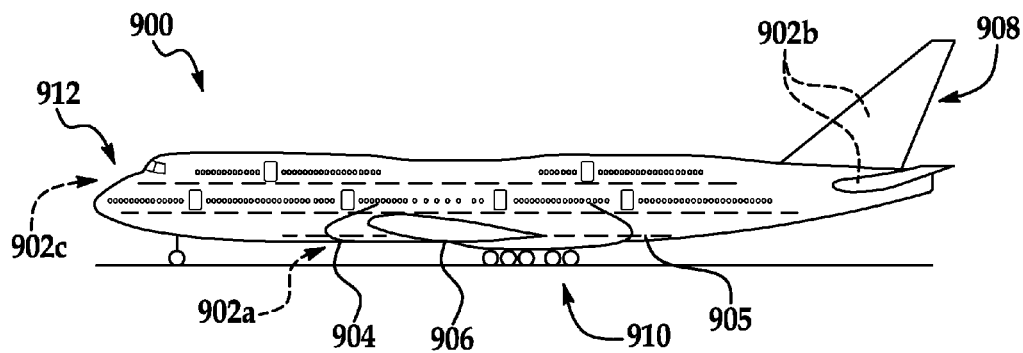
FIG. 5 is a side elevational view of an aircraft having one or more components fabricated using methods and systems for manufacturing in accordance with embodiments of the invention.

It will be appreciated that embodiments of the present invention may be used to manufacture a wide variety of products, and the invention is not limited to the particular embodiments and products described above. For example, FIG. 5 is a side elevational view of an aircraft 900 having one or more components 902 fabricated using methods and systems for manufacturing in accordance with embodiments of the invention. In this embodiment, the aircraft 900 generally includes a fuselage 905 including wing assemblies 906, a tail assembly 908, and a landing assembly 910. The aircraft 900 further includes one or more propulsion units 904, a control system 912 (not visible), and a host of other systems and subsystems that enable proper operation of the aircraft 900.

It will be appreciated that systems and methods in accordance with the present invention may be utilized in the fabrication of any number of components 902 of the aircraft 900, including, for example, the various components and sub-components of the tail assembly 908, the wing assemblies 906, the fuselage 905, the propulsion units 904, and any other suitable portion of the aircraft 900. Of course, embodiments of the present invention may also be used to manufacture the aircraft 900 in its entirety.

Although the aircraft 900 shown in FIG. 5 is generally representative of a commercial passenger aircraft, including, for example, the 737, 747, 757, 767, 777, and 7E7 models commercially-available from The Boeing Company of Chicago, Ill., the inventive systems and methods disclosed herein may also be employed in the assembly of virtually any other types of aircraft. More specifically, embodiments of the present invention may be applied to the manufacture and assembly of other passenger aircraft, fighter aircraft, cargo aircraft, rotary aircraft, and any other types of manned or unmanned aircraft, including those described, for example, in The Illustrated Encyclopedia of Military Aircraft by Enzo Angelucci, published by Book Sales Publishers, September 2001, and in Jane's All the World's Aircraft published by Jane's Information Group of Coulsdon, Surrey, United Kingdom, which texts are incorporated herein by reference.

It may also be appreciated that alternate embodiments of apparatus and methods in accordance with the present invention may be utilized in the manufacture of a wide variety of other products, including, for example, boats, ships, missiles, automobiles and other vehicles, buildings, or any other suitable products or assemblies. Embodiments of systems and methods in accordance with the present invention may improve the efficiencies and accuracies of manufacturing processes, and may reduce costs associated with product design and manufacture in comparison with prior art systems and methods.

Referring next to FIGS. 6-13, an illustrative embodiment of a precedence transversal method for visualization of a product build, hereinafter method, is shown. The method may enable a user such as a tool design engineer, an ergonomic engineer or a manufacturing engineer, for example and without limitation, to visualize in a virtual format the temporal assembly configuration of a product at any point in the build sequence of the product. This visualization may enable a user such as a designer or technician of any one of a number of technical disciplines (e.g. mechanical, electrical, structural, etc.) which contribute to the design and assembly of the product to efficiently and collaboratively analyze the user's view of the product and process requirements at any point in the build sequence of the product. Consequently, each authorized user may implement updates to the product design, resource design and manufacturing processes prior to actual assembly of the product. The method may eliminate the need for a user to manually interpret the temporal configuration of the product at a particular point during the build sequence. Because it may be affected by input from users from the various technical disciplines, the temporal configuration of the product may change rapidly throughout the build sequence of the product. Therefore, the method may enhance the users' ability to determine whether subassemblies, assemblies or components of the product are installed in a sequence which supports specific assembly sequence requirements prior to production implementation. This may eliminate assembly sequence conflicts which may otherwise require rework of the product or product assembly sequence.

Figure 6:
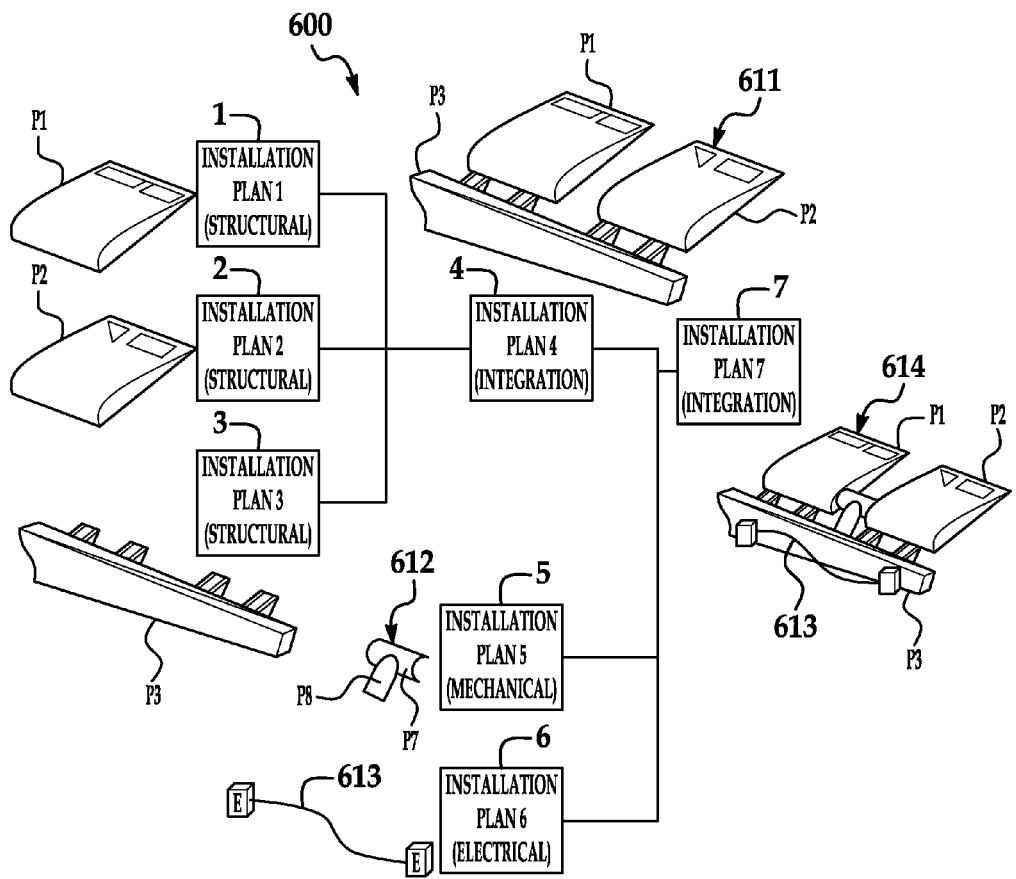
FIG. 6 is a simple process precedence diagram that shows the build-up of a product according to an illustrative embodiment of the precedence transversal method for visualization of product build.

FIG. 6 illustrates a simple process precedence diagram 600 that illustrates the build-up of a structure 614 such as a wing portion of an aircraft, for example and without limitation, in implementation of an illustrative embodiment of the method. It will be understood that the method may be used to visualize the temporal assembly configuration of a product at any point in the build sequence of the product in any of a number of industries including but not limited to the aerospace industry.

In the example shown in FIG. 6, multiple installation plans 1-7 are successively implemented to build the product 614. Each Installation plan may include one or more processes, components and/or resources which direct the building of a subassembly or assembly of the structure 614. Each of Installation plans 1, 2 and 3 is a predecessor to Installation plan 4 and will direct the building of a corresponding subassembly of the product 614 from one or multiple components. In some embodiments, Installation plans 1, 2 and 3 will direct the production of subassemblies P1, P2 and P3, respectively, which, at the level of implementation of each installation plan, may have no relationship in physical space to each other. Installation plan 4 will direct integration/assembly of the subassemblies P1, P2 and P3 which were produced by implementation of Installation plans 1, 2 & 3 into an assembly 611. Installation plans 5 and 6 may direct the production of subassemblies 612 (which includes components P7 and P8) and 613, respectively, which, at the level of implementation of each installation plan, may have no relationship in physical space to each other. Installation plan 7 will direct the addition of an electrical component 613 to the assembly 614 which was produced by implementation of the predecessor Installation plan 4 and integration of Installation Plans 5 & 6. Installation plan 7 will have the ability to load in a virtual format the visualized state of the entire precedence structure 614 (which may include the subassemblies P1, P2 and P3 integrated through implementation of Installation plan 4 in addition to the mechanical component 612 added by implementation of Installation plan 7 and the electrical component 613 added by implementation of Installation plan 7).

The Precedence Transversal Method may use a logic statement to analyze the predecessor Installation plans (processes) containing associated components or subassemblies of the structure 614 and allow the resulting temporal build state of the structure 614 to be visualized. This method may differ from one current method in which the subassemblies resulting from implementation of Installation plans 1, 2 & 3 would need to be referenced (added) in Installation plan 4 to allow for temporal display of the assembly 611 in the visualization of Installation plan 4. The method of the present disclosure may save the manufacturing engineer time by not requiring the subassemblies from the predecessor installation plans to be referenced in Installation plan 4. Additionally, according to the method of the disclosure, if any of the subassemblies P1, P2 and P3 referenced in Installation plans 1, 2 & 3 is revised, the revision may be automatically reflected in the temporal assembly state of the assembly 611 upon visualization of Installation plan 4. This automatic update to the temporal assembly state of the assembly 611 in Installation plan 4 may reduce errors and allow multiple configurations to be displayed with no need to manually maintain configuration-specific temporal assembly states.

Figure 7:
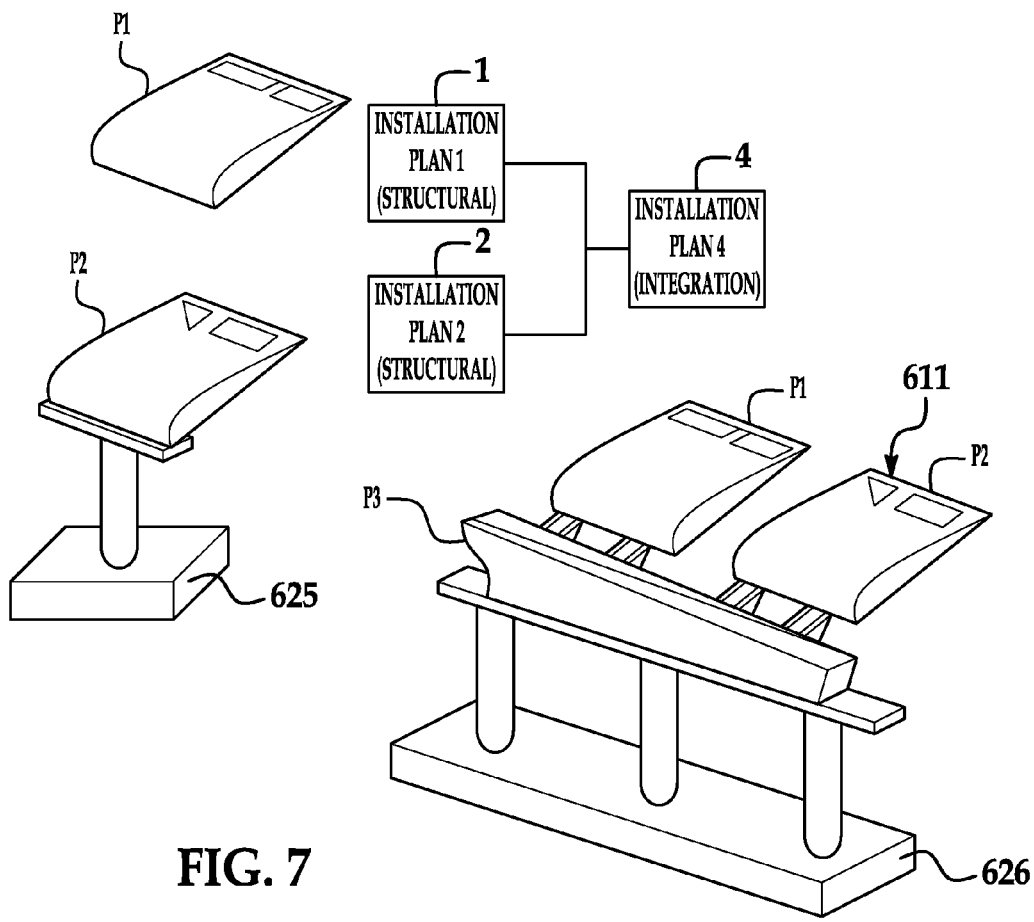
FIG. 7 is a schematic block diagram which illustrates the manner in which parts and resources are visualized according to an illustrative embodiment of the precedence transversal method.

FIG. 7 depicts the manner in which components and resources of each installation plan may be visualized in implementation of the method. An assembly tool 625 which is used in production of the subassembly P2 may be referenced within Installation plan 2. When Installation plan 2 is visualized, the assembly tool 625 may be displayed. An assembly tool 626 may be referenced within Installation plan 4. When Installation plan 4 is visualized, the assembly tool 626 may be displayed. A relation type may be added to the resource object which corresponds to the assembly tool 625 such that the assembly tool 625 is displayed at first use (upon visualization of Installation plan 2) but then removed from the next succeeding installation plans that no longer require use of the assembly tool 625 (in this case, the assembly tool 625 is removed when Installation plan 4 is visualized). The logic statement in the Precedence Transversal Method may analyze the attribute on the resource object in relation to the assembly tool 625 and either display or filter off the resource object in relation to the assembly tool 625 depending on its attribute value.

Figure 8:
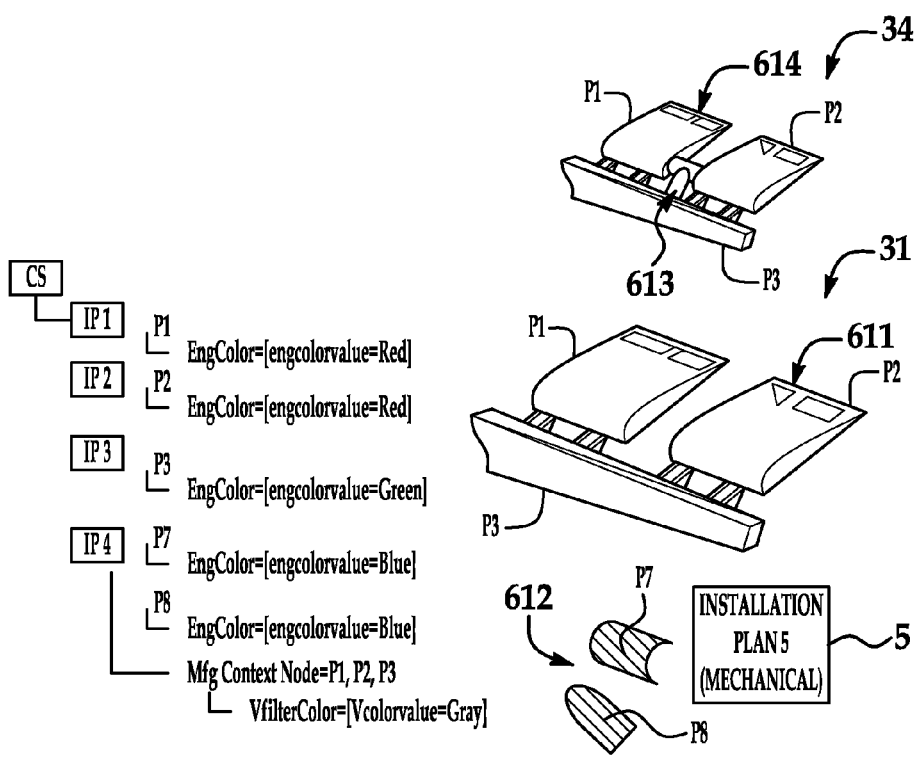
FIG. 8 is a diagram which illustrates the results of applying a visibility filter as part of the context load process.

In some applications of the method, a visibility filter may be applied to any of the components, subassemblies or resources in any of the installation plans as part of the context load process to indicate which components, subassemblies and/or resources have been previously installed in a foregoing installation plan and which are being acted upon in the noted installation plan. FIG. 8 shows the results of applying a visibility filter to components P7 and P8 of the mechanical component 612 which is associated with Installation plan 5. Upon visualization of installation plan 7, the visibility filter may allow the components P7 and P8 of the mechanical component 612 to be represented using an assigned color or appearance. The Manufacturing Context 31 of components P1, P2 & P3 may be calculated from the predecessor Installation plans 1, 2 and 3 and components P7 and P8 may be manipulated using the visualization filter and loaded for Installation plan 7. Upon subsequent visualization of Installation plan 7, components P7 and P8 may have a selected color or appearance such as, for example and without limitation, a transparent appearance; a monochromatic appearance; or any other single chosen color or appearance.

In FIG. 8, the visualization result of Installation plan 7 is generally indicated by reference numeral 34 in which the context subassemblies P1, P2 & P3 may be displayed as a first color and the components associated to Installation plan 5 (P7 and P8) may be shown as a second color which is different from the first color. For example and without limitation, in some embodiments the subassemblies P1, P2 and P3 may be displayed in the color value=gray and the components associated to Installation plan 5 (P7 and P8) may be shown as the engineering assigned color value=blue. In the foregoing manner, the user who views the build state by visualization of Installation plan 7 can determine which components and/or resources have been previously installed in preceding installation plans and which components and/or resources are being acted upon in the noted Installation plan.

Manufacturing Context Visualization Filter Statement:

In some embodiments of the method, for each engineering part or resource returned in the calculation of manufacturing context, the following may be applied:

Mfg Context Node calculation=P1, P2, P3 and/or all parts returned in context calculation VfilterColor=[Vcolorvalue] Vcolorvalue=gray P1 Find Engineering attribute=[engcolorvalue=Red] suppress P1 [engcolorvalue=Red]

Apply P1 [Vcolorvalue=Gray]

P2 Find Engineering attribute=[engcolorvalue=Red] suppress P1 [engcolorvalue=Red]

Apply P2 [Vcolorvalue=Gray]

P3 Find Engineering attribute=[engcolorvalue=Green] suppress P1 [engcolorvalue=Green]

Apply P3 [Vcolorvalue=Gray]

Figure 9:
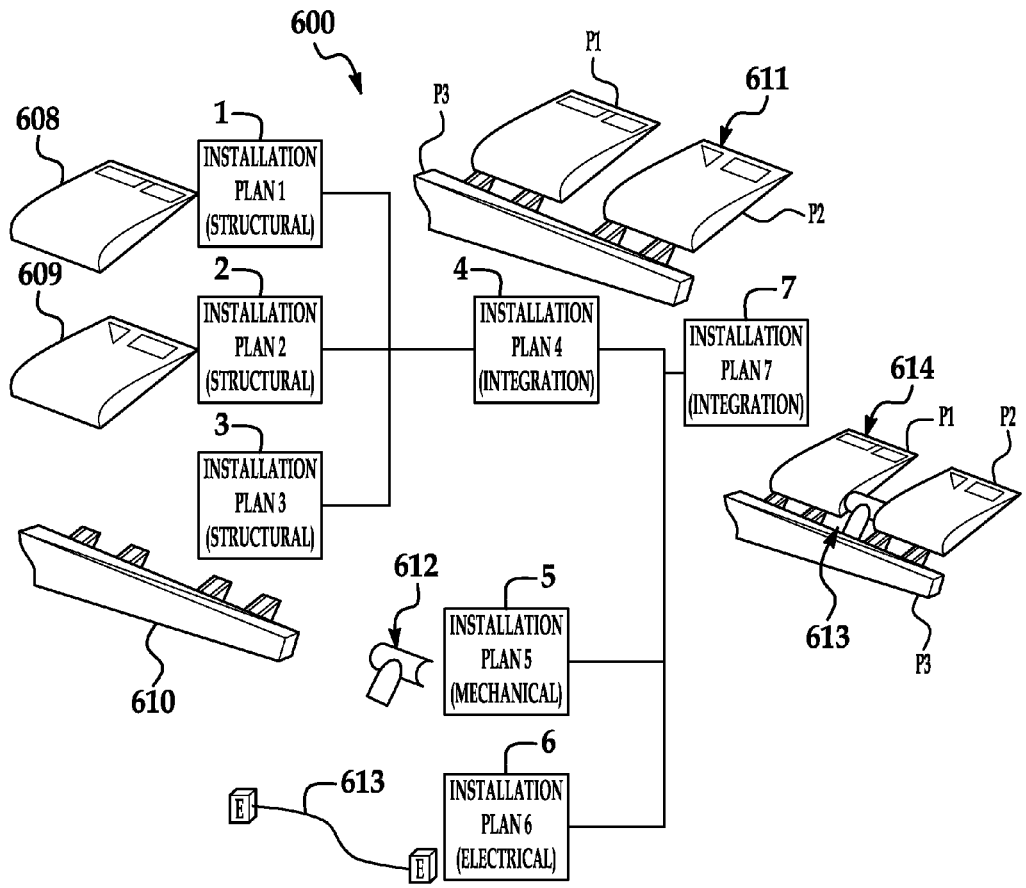
FIG. 9 is a diagram which illustrates the results of applying an attribute filter to a context calculation.

In some embodiments of the method, an attribute of installation plan type may be associated with each installation plan. The attribute of installation plan type may facilitate omission of a selected component or components upon visualization of an installation plan. FIG. 9 shows the results of applying an attribute filter to a context calculation 48 in visualization of Installation Plan 7. Installation Plan 4 may have an Installation Plan Type attribute=Integration; Installation Plan 5 may have an Installation Plan Type attribute=Mechanical; Installation Plan 6 may have an Installation Plan Type attribute=Electrical; and Installation Plan 7 may have an Installation Plan Type attribute=Integration. If the Manufacturing Context attribute filter has a parameter [Installation Plan Type] not="electrical" then as the manufacturing context for Installation Plan 7 is calculated, the electrical component 613 associated to Installation Plan 6 may not be considered in the results; therefore, the electrical component 613 may be omitted from the structure 614 upon visualization of Installation Plan 7.

Figure 10:
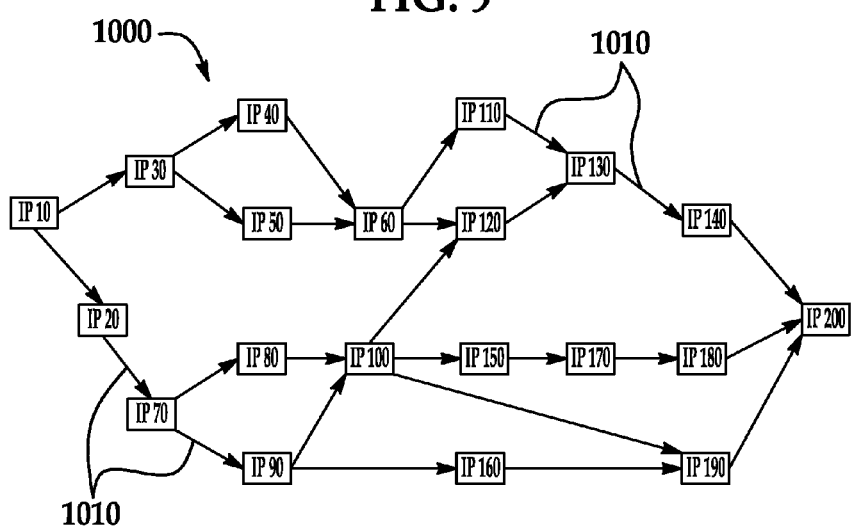
FIG. 10 is a diagram which illustrates a control station precedence network.

Referring next to FIG. 10, a diagram 1000 which illustrates a control station precedence network suitable for implementation of the method is shown. Within an installation build system, a series of processes embedded in multiple installation plans (IPs) may progressively add components to produce a product. When a first installation plan must be completed before a second installation plan can be started, the first installation plan is said to have precedence over the second. Precedence of installation plans in an installation build system may be systematically defined by connecting the installation plans with precedence relations 1010. When a group of installation plans is defined to produce a product, the installation plans may be linked by a set of precedence relations 1010 to define a network 1000.

In the example of the control station precedence network 1000 which is shown in FIG. 10, IP 10 must be completed before IP 20 and IP 30 can begin. IP 20 must be completed before IP 70 can begin and IP 30 must be completed before IP 40 and IP 50 can begin, and so forth. The last installation plan is IP 200, conclusion of which completes the assembly process for the product.

Figure 11:
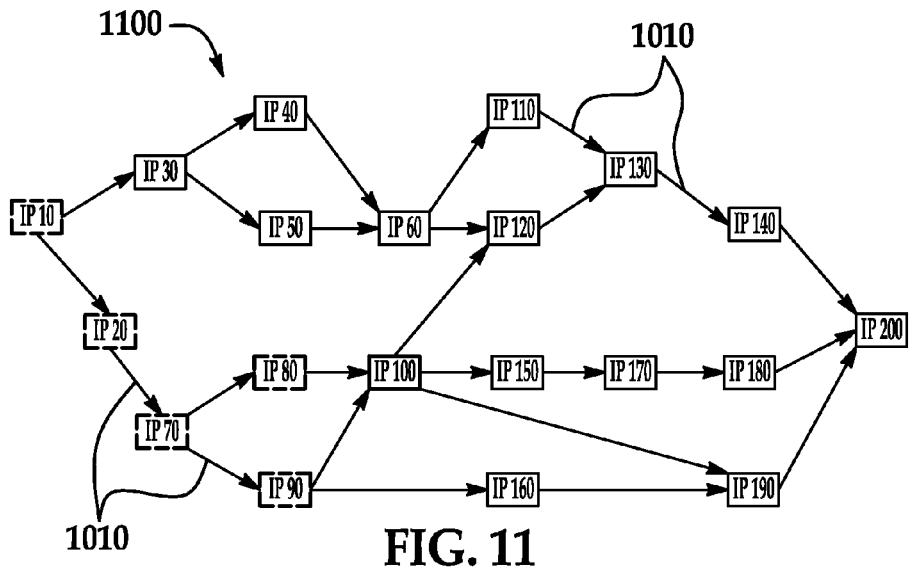
FIG. 11 is a diagram which illustrates a "minimum" manufacturing context.

Referring next to FIG. 11, a diagram 1100 which illustrates a "minimum" manufacturing context is shown. A user such as a manufacturing engineer, for example and without limitation, may use manufacturing context to define which components must be installed in a product prior to beginning a given process which continues assembly of the product (minimum manufacturing context). This minimum manufacturing context may allow the user to visualize the state of the product at the beginning of any process or installation plan (IP) by calculating and loading components and resources which were previously installed in (and not removed from) prior installation plans. FIG. 11 illustrates the processes that must be executed before IP 100 can begin. Therefore, IP 10 must be completed before IP 20 can begin; IP 20 must be completed before IP 70 can begin; IP 70 must be completed before IP 80 and IP 90 can begin; and IP 80 and IP 90 must be completed before IP 100 can begin.

Figure 12:
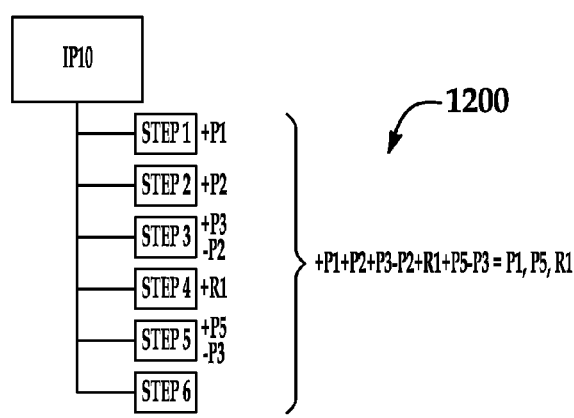
FIG. 12 is a diagram which illustrates a calculated context list.

Referring next to FIG. 12, a diagram 1200 which illustrates a calculated context list in implementation of an illustrative embodiment of the method is shown. Each process or installation plan may be progressively evaluated to sum the net context (adds or subtracts) to cumulate the total context list (minimum manufacturing context). The diagram 1200 shows the net parts and resources added in successive steps by IP 10 of the control station precedence network 1000 (FIG. 10).

Figure 13:
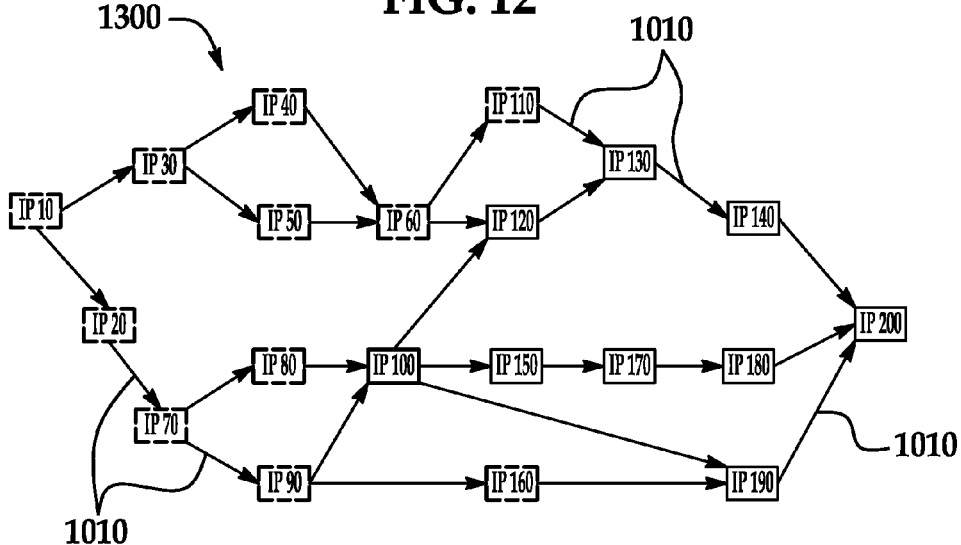
FIG. 13 is a diagram which illustrates a "maximum" manufacturing context.

Referring next to FIG. 13, a diagram 1300 which illustrates a "maximum" manufacturing context in implementation of an illustrative embodiment of the method is shown. The diagram 1300 demonstrates all processes or installation plans that could be completed before IP 100 is executed. IP 100 has precedence over the remaining installation plans since IP 100 must be completed before the remaining installation plans can be executed. It may be necessary to consider the maximum manufacturing context when validating precedence relations 1010 for IP 100. A manufacturing engineer or other user may also be able to calculate and load components and resources that may be installed (maximum manufacturing context) based upon components and resources that have already been installed and not removed and that are not in the succeeding path or precedence relations 1010 (i.e. must be installed after).

In an exemplary application of the method, a tool design engineer may use the temporal state representation of a subassembly, structure or finished product at one or more of the installation plans to determine which components are already assembled at a certain point in the assembly sequence of the subassembly, structure or product. This may allow the tool design engineer to clearly understand the tool design requirements for assembling the subassembly, structure or product at the selected installation plan. In another exemplary application of the method, an ergonomics engineer may use the temporal state representation of a subassembly, structure or finished product at one or more of the installation plans to analyze whether a factory technician can easily reach into a product bay and route wires past previously-installed mechanical ducts in the subassembly, structure or product. In still another exemplary application of the method, a manufacturing engineer may assess whether a redesigned component will interfere with an existing assembly tool by viewing the temporal state of a subassembly, structure or product to understand the product build configuration at the point where the change is being made.

Figure 14:
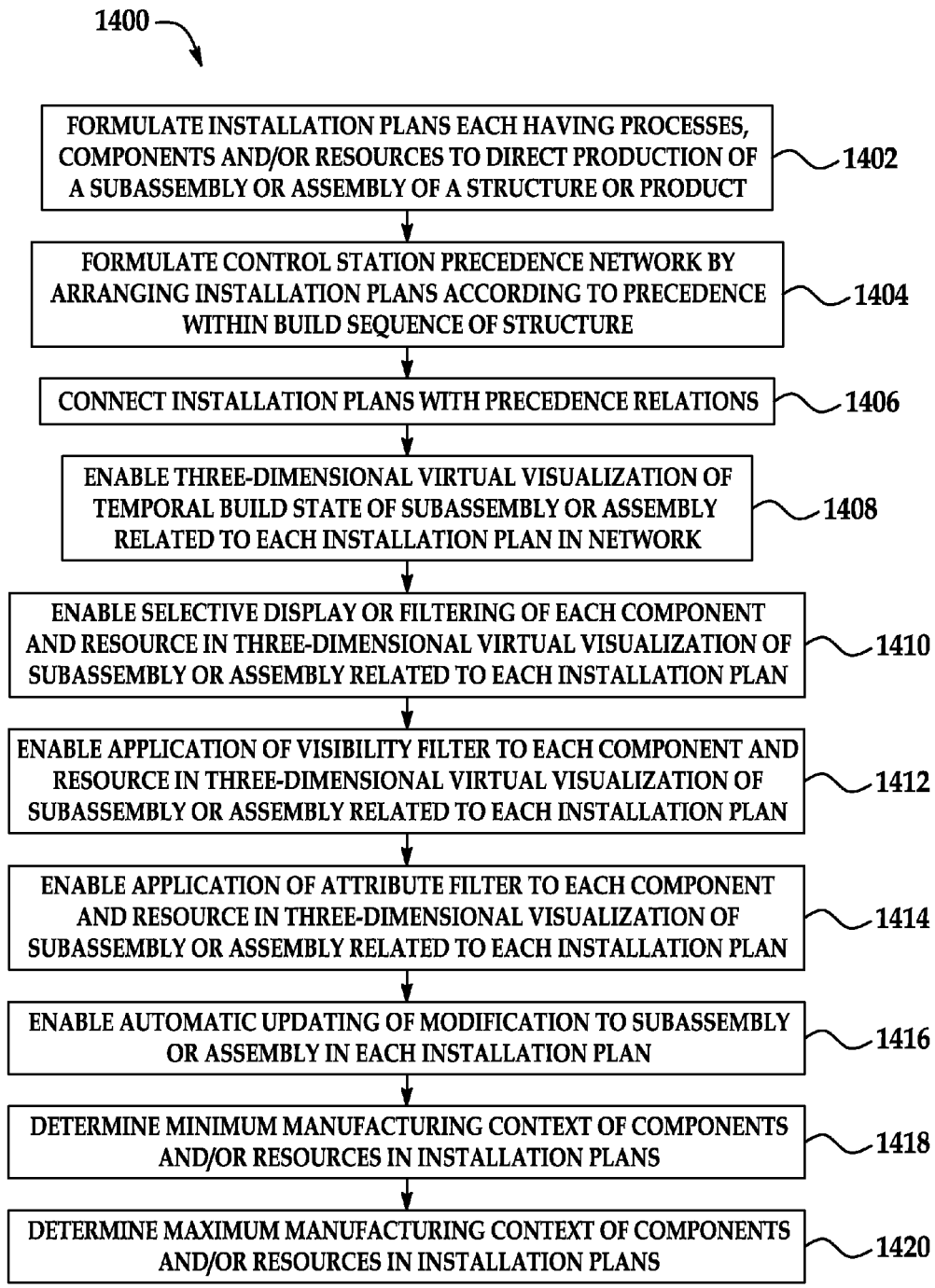
FIG. 14 is a flow diagram of an illustrative embodiment of the precedence transversal method for visualization of product build.

Referring next to FIG. 14, a flow diagram 1400 of an illustrative embodiment of the precedence transversal method for visualization of product build is shown. In block 1402, installation plans each having processes, components and/or resources to direct production of a subassembly or assembly of a structure or product are formulated. In block 1404, a control station precedence network is formulated by arranging the installation plans according to precedence within the build sequence of the structure or product. In block 1406, the installation plans may be connected with precedence relations. In block 1408, three-dimensional virtual visualization of the temporal build state of the subassembly or assembly related to each installation plan in the network is enabled. In block 1410, selective display or filtering of each component and resource in the three-dimensional virtual visualization of the subassembly or assembly related to each installation plan may be enabled. This may be accomplished by assigning a relation type to the resource object associated with each component and resource in each installation plan. In block 1412, application of a visibility filter to each component and resource in the three-dimensional virtual visualization of the subassembly or assembly which is related to each installation plan may be enabled. The visibility filter may facilitate presentation of selected components and resources in each installation plan in a selected color and enable a user to determine which components and/or resources have previously been installed and which parts or resources are being acted upon in a noted installation plan. In block 1414, application of an attribute filter to any component and resource in the three-dimensional virtual visualization of the subassembly or assembly in each installation plan may be enabled. Application of an attribute filter to a component or resource may facilitate selective omission of that component or resource from the visualization of a component if the component or resource belongs to a selected installation plan type attribute (such as integration, mechanical or electrical, for example and without limitation). In block 1416, automatic updating of modification to the subassembly or assembly in each installation plan may be enabled. In block 1418, the minimum manufacturing context of the components and/or resources in the installation plans may be determined. In block 1420, the maximum manufacturing context of components and/or resources in the installation plans may be determined.

Figure 15:
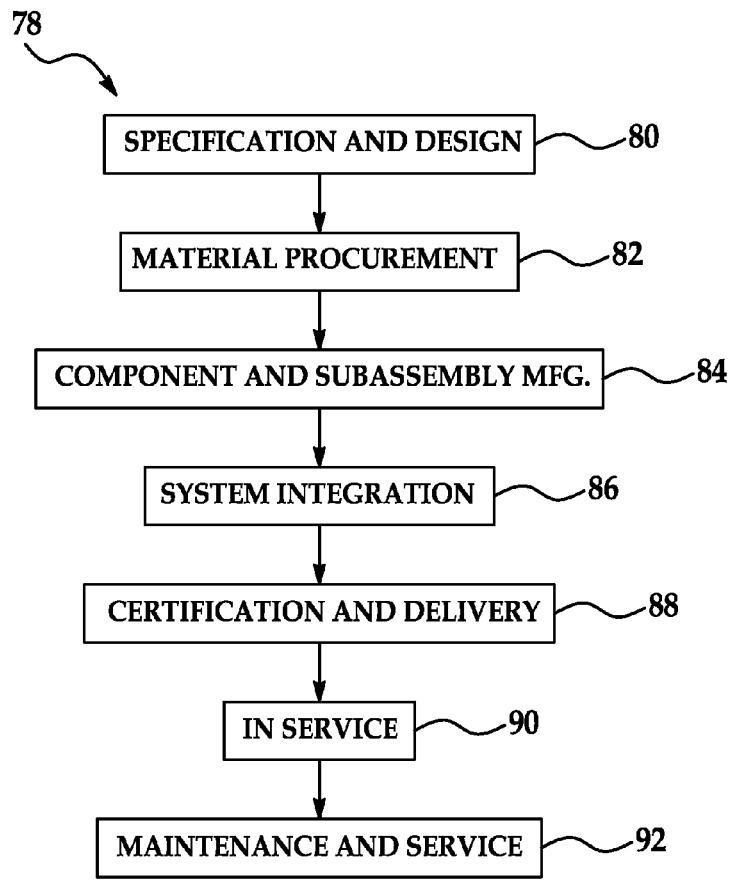
FIG. 15 is a flow diagram of an aircraft production and service methodology.
Figure 16:
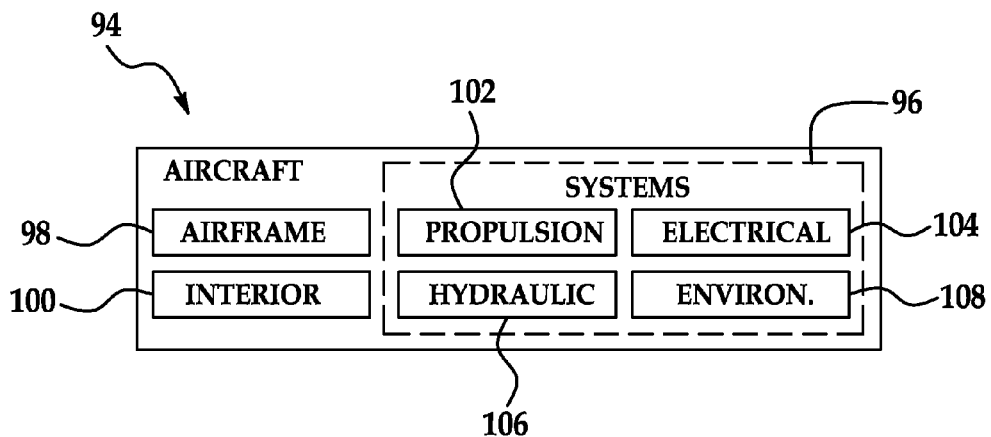
FIG. 16 is a block diagram of an aircraft.

Referring next to FIGS. 15 and 16, embodiments of the disclosure may be used in the context of an aircraft manufacturing and service method 78 as shown in FIG. 15 and an aircraft 94 as shown in FIG. 16. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 may be scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 16, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the invention may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Although the embodiments of this disclosure have been described with respect to certain exemplary embodiments, it is to be understood that the specific embodiments are for purposes of illustration and not limitation, as other variations will occur to those of skill in the art.

While various embodiments of the invention have been illustrated and described, as noted above, many changes can be made without departing from the spirit and scope of the invention. Accordingly, the scope of the invention is not limited by the disclosure of the various embodiments. Instead, the invention should be determined entirely by reference to the claims that follow.

What is claimed is:

1. A method for visualization of a product build, said method performed by executing computer readable instructions stored in memory, said method comprising:

formulating, at one or more processing units, a plurality of manufacturing installation plans each having processes, components and resources configured to direct production in a manufacturing process of a portion of a product within a build sequence of said product, at least one installation plan of the plurality of installation plans associated with one or more preceding installation plans to be performed before the at least one installation plan within said build sequence;

formulating, at the one or more processing units, a control station precedence network by arranging said installation plans according to precedence within said build sequence of said product, the precedence network including logical precedence relations between installation plans and the precedence relations defining which installation plans must be completed before other installation plans may be started;

generating, at the one or more processing units, a three-dimensional virtual visualization of a temporal build state within said build sequence of said portion of a product for the at least one installation plan, revisions to the one or more preceding installation plans automatically accounted for in the at least one installation plan;

determining a minimum manufacturing context of said components in a given installation plan corresponding to said portion of a product, the minimum manufacturing context defining which installation plans must be completed prior to beginning the given installation plan; and determining a maximum manufacturing context of said components in the given installation plan, the maximum manufacturing context defining which installation plans could be completed prior to beginning the given installation plan.

2. The method of claim 1 further comprising enabling selective display or filtering of each component or resource of said portion of a product in said three-dimensional virtual visualization.

3. The method of claim 1 further comprising enabling application of a visibility filter to components or resources of said portion of a product in said three-dimensional virtual visualization, the visibility filter causing components or resources that are to be acted upon during performance of the at least one installation plan to exhibit a color or appearance distinguished from a color or appearance of components or resources that are to be acted upon during performance of the one or more preceding installation plans.

4. The method of claim 3 wherein said enabling application of a visibility filter to components or resources of said portion of a product comprises applying a selected color or appearance to components or resources.

5. The method of claim 4 wherein applying a selected color or appearance to components or resources comprises applying a monochromatic appearance to each component or resource.

6. The method of claim 4 wherein applying a selected color or appearance to components or resources comprises applying a transparent appearance to components or resources.

7. The method of claim 1 further comprising enabling application of an attribute filter to a context of the at least one installation plan, every component or resource of said portion of a product in said three-dimensional virtual visualization possessing an attribute designated in the attribute filter.

8. The method of claim 1 further comprising the step of transmitting the results for the three-dimensional virtual visualization of the temporal build state for the at least one installation plan to an output device.

* * * * *